United States Patent [19]

Weseloh

[11] Patent Number: 4,657,230

[45] Date of Patent: Apr. 14, 1987

[54] OVERTRAVEL SPRING ASSEMBLY FOR SLACK ADJUSTER

[75] Inventor: Roger J. Weseloh, South Holland, Ill.

[73] Assignee: American Standard Inc., Chicago, Ill.

[21] Appl. No.: 369,064

[22] Filed: Apr. 16, 1982

Related U.S. Application Data

[63] Continuation of Ser. No. 142,282, Apr. 21, 1980, abandoned.

[51] Int. Cl.$^4$ ............................................. F16F 1/10
[52] U.S. Cl. .................................. 267/71; 213/40 R;
 248/600; 267/72; 267/169; 267/170
[58] Field of Search .................. 267/60, 61 R, 70, 71,
 267/72, 166, 167, 168, 169, 170, 174, 177, 178,
 179; 248/565, 600, 610, 613; 213/40 R

[56] References Cited

U.S. PATENT DOCUMENTS

| | | | |
|---|---|---|---|
| 172,479 | 1/1876 | Peter | 267/70 |
| 703,118 | 6/1902 | Cox | 213/40 R |
| 1,795,719 | 3/1931 | Hardison | 267/71 X |
| 2,835,463 | 5/1958 | Suozzo | 248/613 X |
| 3,178,035 | 4/1965 | Peterson | 267/138 X |
| 3,466,086 | 9/1969 | James et al. | 267/60 X |
| 3,797,817 | 3/1974 | Deisenroth | 267/71 |
| 4,193,587 | 3/1980 | Cline | 267/177 X |

Primary Examiner—George E. A. Halvosa
Attorney, Agent, or Firm—J. O. Ray, Jr.

[57] ABSTRACT

An overtravel spring assembly including a helical-type spring secured in a cylindrical housing in a prestressed state between retaining washers inserted adjacent the opposite ends of the housing. The spring is coaxially disposed in the assembly between the inner surface of the housing and the outer surface of a sleeve member inserted within the spring, thereby retaining the spring in a symmetrically coiled state, that is, preventing radial distortion or buckling of the spring spring when subjected to operating stress. The entire spring assembly is retained in its assembled state by radially crimping the opposite ends of the housing against the outer radial surfaces of the retaining washers. The overtravel spring assembly is used in an automatic slack adjuster for vehicle brakes for measuring the extent of overtravel of the piston rod due to excessive wear of the brake shoes.

1 Claim, 5 Drawing Figures

U.S. Patent  Apr. 14, 1987  Sheet 1 of 2  4,657,230 a
OVERTRAVEL SPRING ASSEMBLY FOR SLACK ADJUSTER

This is a continuation of application Ser. No. 142,282, filed Apr. 21, 1980, and now abandoned.

BACKGROUND OF THE INVENTION

The overtravel spring assembly herein disclosed is used in automatic vehicle brake slack adjusters for measuring the amount of overtravel of the piston during a brake application operation and for preventing lock-up of the adjusting mechanism when such overtravel occurs.

The present structure of one form of overtravel spring assembly presently used comprises a cylindrical housing having an annular collar-like retainer welded in place at one end of the housing against which the corresponding end of a spring rests. The opposite end of the cylindrical housing is internally threaded for receiving a totally machined annular collar-like retainer after the spring has been prestressed to a desired degree. This known structure, due to machining and assembly operations is costly to produce.

SUMMARY OF THE INVENTION

The object of the present invention, therefore, is to provide an overtravel spring assembly less costly to produce and to assemble.

Briefly, the invention resides in an overtravel spring assembly comprising an outer cylindrical housing having a prestressed helical spring coaxially disposed therein between the housing and a sleeve member inserted inside the spring. The spring is compressed between two annular retainers, one adjacent each end of the housing, each end of said housing being crimped so as to overlap the outer radial surfaces of said retainers for holding the assembly in assembled relation.

DESCRIPTION & OPERATION

Figure 1:
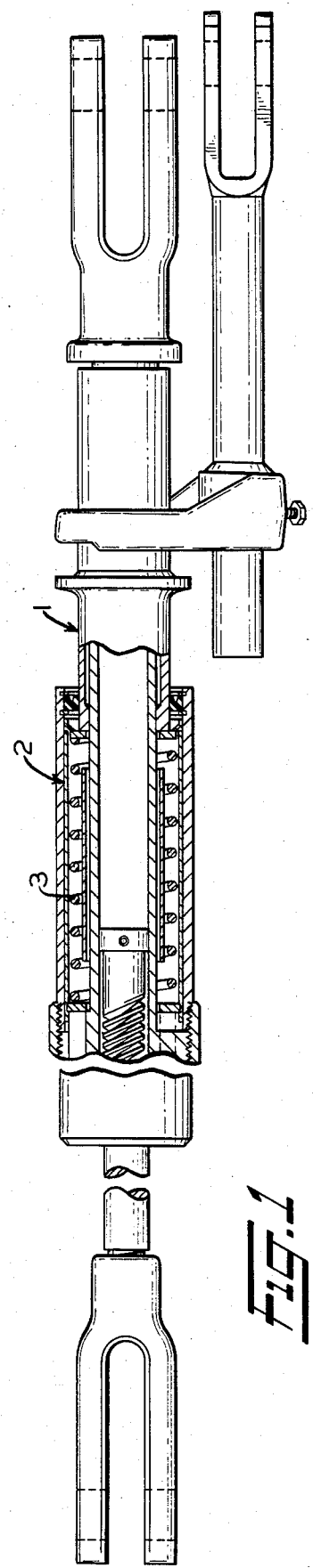
FIG. 1 is an abreviated view, mostly in outline and on a reduced scale, of an automatic slack adjuster showing the relative position of an overtravel spring assembly installed therein.

An automatic slack adjuster 1, as shown in FIG. 1, is normally installed in the lever system (not shown) of conventional brake rigging and acts automatically to take up slack in the lever system resulting from brake shoe wear. An overtravel spring assembly 2 is shown in its relative disposition in the slack adjuster 1.

The overtravel spring assembly measures the amount of travel of the brake cylinder (not shown) each time a brake application occurs. An overtravel helical type spring 3, normally compressed to a predetermined degree in the spring assembly 2, is further compressed if such piston travel exceeds the preset amount (due to brake shoe wear, for example). The length of the adjuster is automatically shortened when the brakes are released as regulated by the overtravel spring compression, such that correct piston travel is restored at the next brake application. In the event of excessive brake shoe wear, the overtravel spring deflection is limited by an inner sleeve member which not only protects overtravel spring 3 from operating at excessive stress but also triggers the slack adjuster to insure that the brake shoes (not shown) are brought against the wheels (not shown).

Figure 3:
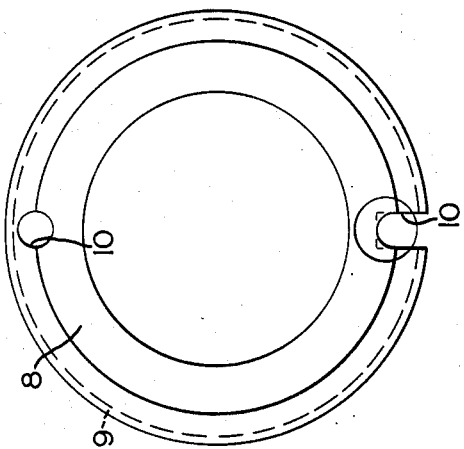
FIG. 3 is an elevational end view in full scale of one component of the PRIOR ART overtravel spring assembly shown in FIG. 2.
Figure 2:
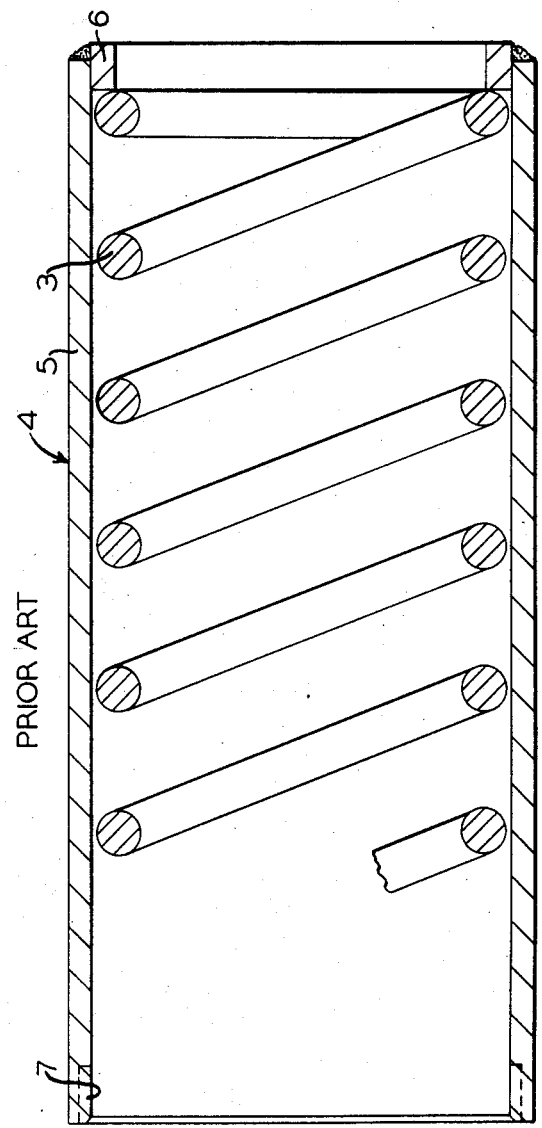
FIG. 2 is an elevational view, in section and in full scale, showing one form of PRIOR ART of the overtravel spring assembly.

Actually, the invention is not primarily concerned with the operation of the slack adjuster 1, but with the structure of overtravel spring assembly 2. As shown in FIG. 2, designated PRIOR ART, a presently known structure of an overtravel spring assembly 4 comprises a cylindrical housing 5 having an annular member 6 welded coaxially adjacent one end of the housing against which one end of the overtravel spring 3 is precompressed. The other end of housing 5 is provided with internal threads 7 for receiving a threaded annular spring seat 8, shown in FIG. 3, against which the end of spring 3 opposite annular member 6 seats. Spring seat 8 is screwed into place after spring 3 has been preloaded to a predetermined compression, such as 220 pounds, for example. Spring seat 8 is provided with external threads 9 and diagonally oppositely disposed notches 10 by which it is screwed into the end of housing 5.

Thus, in addition to the necessity of machining the internal threads 7 on housing 5, spring seat 8 also requires other machining, that is, the threads 9 and opposite outer faces thereof. It is obvious, therefore, that the known overtravel spring assembly 4 is costly to produce and assemble.

Figure 4:
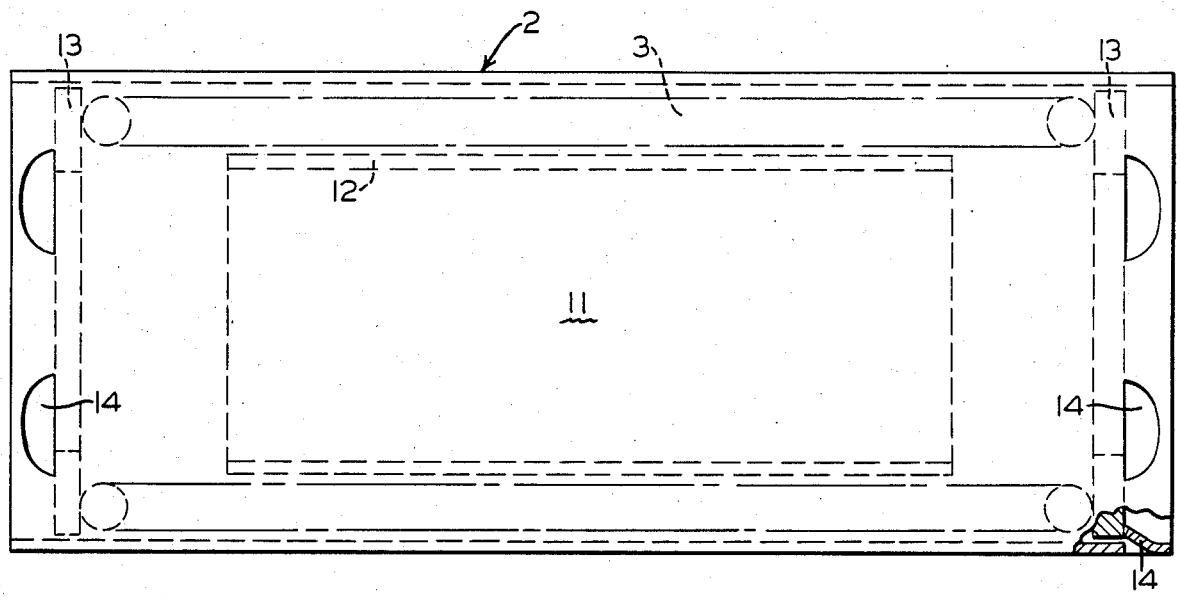
FIG. 4 is an elevational view, in section and in full scale of an overtravel spring assembly according to the present invention.
Figure 5:
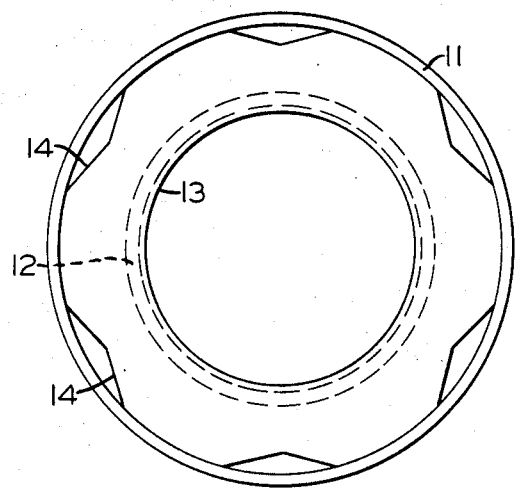
FIG. 5 is an elevational end view in full scale of the overtravel spring assembly shown in FIG. 4 looking toward either end.

The simplified overtravel spring assembly 2, according to the invention, is shown in FIG. 4 of the drawings. Overtravel spring assembly 2 comprises a housing 11 in which overtravel spring 3 is coaxially disposed between said housing and a sleeve member 12 of shorter axial length than said housing. Sleeve member 12 prevents axial buckling of spring 3 when compressed during operation of the slack adjuster. As in the case of overtravel spring assembly 4 of FIG. 2, spring 3 in FIG. 4 is also precompressed in overtravel spring assembly 2 between the inner radial surfaces of a pair of annular retainers 13, one disposed at each end of housing 11. The entire assembly is secured in assembled relation by crimping the perimeters at each end of housing 11 to form a plurality of equiangularly spaced crimp notches 14, such as shown in FIGS. 4 and 5, the crimp notches being of such depth as to extend over retainers 13, thereby preventing said retainers from being axially displaced out the ends of housing 11.

As above described, overtravel spring assembly 2 is obviously less costly to produce and assemble than the presently known overtravel spring assembly 4.

Having thus described the invention, what I claim as new and desire to secure by Letters Patent, is:

1. An overtravel spring assembly, for use in an automatic slack adjuster for railroad car brake apparatus, comprising,
  (a) a cylindrical housing of preselected length,
  (b) a cylindrical sleeve member of selected shorter length than said cylindrical housing length and positioned coaxially therein, (c) an annular spring retainer plate positioned concentrically within and substantially at each end of said housing,
(d) an overtravel helical spring positioned coaxially with and between said housing and said sleeve member and in abutting contact with the inner radial surfaces of said spring retainer plates, and
(e) a plurality of equi-angularly spaced crimp notches positioned around the perimeter at each end of said cylindrical housing and extending radially inward for retaining the corresponding spring retainer plate within the axial length of said housing to maintain a selected precompressed tension in said spring,
(f) each spring retainer plate being free to move axially inward within said housing away from said crimp notches in response to an external force with further compression of said spring to the limit set by said sleeve member.

* * * * *